United States Patent

[11] 3,589,412

[72] Inventors Gerald Isaak Pasternak Levenson; Andrew Green, both of Harrow, England
[21] Appl. No. 1,921
[22] Filed Dec. 29, 1969
Division of Ser. No. 705,329, Feb. 14, 1968.
[45] Patented June 29, 1971
[73] Assignee Eastman Kodak Company Rochester, N.Y.
[32] Priority Feb. 16, 1967
[33] Great Britain
[31] 7409/67

[54] APPARATUS FOR INJECTING FLUID INTO A DISTENSIBLE BAG
4 Claims, 12 Drawing Figs.

[52] U.S. Cl. .......... 141/95, 141/114, 141/198, 141/317, 141/329
[51] Int. Cl. .......... B65b 1/30
[50] Field of Search .......... 141/156—162, 192, 193, 195, 196, 197, 198, 114, 95, 94, 96, 19, 329, 330, 39, 40, 313, 314, 315, 317, 359; 53/59

[56] References Cited
UNITED STATES PATENTS

| | | | |
|---|---|---|---|
| 2,540,615 | 2/1951 | Harrington et al. | 141/195 |
| 3,245,200 | 4/1966 | Shaw | 141/329 X |
| 3,403,826 | 10/1968 | Buford et al. | 141/83 X |

*Primary Examiner*—Houston S. Bell, Jr.
*Attorneys*—Walter O. Hodsdon and Paul R. Holmes

ABSTRACT: An apparatus for processing film that injects fluid into a self-sealing package containing a photosensitive film, measures the distension of the package, terminates the flow of fluid into the package when the package has reached a predetermined size and agitates the package to cause the injected fluid to flow uniformly upon the film emulsion.

ANDREW GREEN
GERALD I. P. LEVENSON
INVENTORS
BY Walter O. Hodsdon
ATTORNEYS

ANDREW GREEN
GERALD I. P. LEVENSON
INVENTORS

BY Walter O. Hodsdon

ATTORNEYS

ANDREW GREEN
GERALD I. P. LEVENSON
INVENTORS

BY Walter O. Hodsdon

ATTORNEYS

APPARATUS FOR INJECTING FLUID INTO A DISTENSIBLE BAG

This application is a division of application Ser. No. 705,329, filed Feb. 14, 1968.

BACKGROUND OF THE INVENTION

Dental X-ray film is normally packed in a lighttight and salivaproof packet or package. When radiographs of a patient's teeth are being made, the entire package containing the film is placed in the patient's mouth. After the exposure has been made, the package is removed and sent to a processing station. Because the film is light sensitive, the package must be opened and the film processed in a darkened area or room. After being removed from the package, the film is placed into the developing and fixing solutions. Every X-ray exposure from every patient goes through the same steps and procedure. Because of the physical requirements of such a process and the multiplicity of steps contained therein, such a process is time consuming and costly. When the time required for processing of one patient's X-rays is multiplied by several patients in a day, the time and cost involved increases rapidly. Because of this it has been the custom to expose a patient's dental X-rays on one visit and have them developed and ready for use on a second subsequent visit; otherwise the valuable time of a dentist is devoted to a period of relative inactivity waiting the processing of the film.

There therefore is a need for a system which will facilitate the rapid processing of exposed X-ray film in the dentist's office. Several attempts have been made to satisfy this need. Dental film packages have been developed with pods of developer and fixed contained therein. After the exposure of the film, the developer pod is ruptured allowing the solution to cover the film in the package. After a time, the fixer solution is released in a similar manner. The film is then removed from the package by the dentist. The package however is bulky for oral use and is also expensive.

Another system uses a hypodermic needle to inject developer fluid into the packet to process the film. In this system, however, there is danger of the operator or the film being scratched or pierced by the needle.

There presently is a demand for an apparatus and procedure which would enable a dentist or technician to expose a film and immediately process the package in a normally lighted room thereby allowing the dentist to examine the X-rays shortly after exposure and without requiring a return visit on the part of the patient.

SUMMARY OF THE INVENTION

The invention provides an apparatus for processing a photographic element contained in a package comprising means for receiving the package, an injector for piercing the cover and means for pumping a predetermined quantity of processing fluid through the injector into the package.

The pumping of processing fluid into the package is initiated by the package itself on insertion into the package-receiving means. The package-receiving means is preferably in the form of a pair of jaws whereinto the package is inserted, the injector being located between the jaws.

Sensing means are provided to terminate the injection of processing fluid into the package when the package has swollen to a predetermined size. Visible or audible alarm means are also provided for indicating when the package is full. The injector is preferably in the form of a hypodermic needle and is located in a retractable sheath or other cover to avoid contamination of the needle and oxidation of processing fluid thereon prior to insertion of the injector into a package.

The apparatus is conveniently provided with a processing fluid container which is of a flexible material. Sensing means are provided for indicating when the container requires refilling or replacing. Such indicated means comprise audible and/or visible warning means and can interrupt the circuit of a pump for the injector so that the apparatus can no longer be operated.

A package that is particularly useful with the present invention comprises a liquid-impermeable envelope containing a light-sensitive material, the liquid-impermeable envelope having a surface or a surface portion readily pierceable by an injector in such manner that the injector is not likely to score the film contained within the package.

The surface or the surface portion is preferably self-sealing so that after withdrawal of the injector the perforation made thereby seals to prevent the egress of liquid from the package.

Certain grades of polyvinyl chloride are suitable for self-sealing, but, if necessary, the surface or surface portion can be of a different material or backed by a suitably elastic material which will provide the self-sealing.

Another useful embodiment of the package has heat seals along three edges and a folded and unflattened fourth edge so as to present a surface part which is more or less at right angles to the generally plane of the package.

The package can also be provided with a raised blister wherein the injector can be inserted.

The various features of novelty which characterize the invention are pointed out with particularity in the claims annexed to and forming a part of the specification. For a better understanding of the invention, the operating advantages and the objectives obtained by its use, reference should be had to the accompanying drawings and descriptive matter in which a preferred embodiment of the invention has been illustrated.

DESCRIPTION OF THE PREFERRED EMBODIMENT

Figure 1:
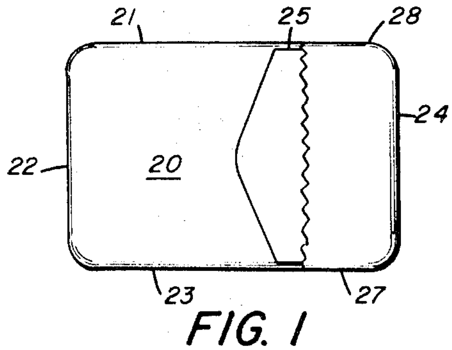
FIG. 1 is a plan view of a preferred form of a package for a photographic element which can be used with the present invention.
Figure 2:
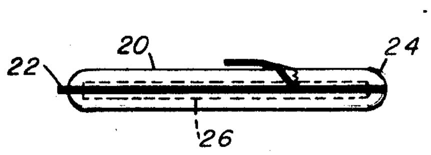
FIG. 2 is a diagrammatic side elevation of the package shown in FIG. 1.

Referring to FIGS. 1 and 2, there is shown a package for a photographic element, in the present instance a dental film, comprising a moistureproof envelope 20, heat seal on three edges 21, 22, 23, and having a folded over fourth edge 24. A flap 25 is crimp sealed to the top surface of the package 20. By providing a folded edge 24, a portion of the material of the package at that position is provided at right angles to the general plane of the package and facilitates penetration of an injector to be described hereinafter.

The material of the package is preferably of a synthetic plastics material so as to be salivaproof on insertion of the package into the mouth of a dental patient and to withstand the processing solution. The material, particularly in the region of the folded edge 24, has the property of being self-sealing or has an inner layer (not shown) which has such a property so that after withdrawal of an injector the package is self-sealing to contain processing fluid therein. The package contains a small photographic element 26, which, in the present instance, is an X-ray sensitive film. It is to be noted, additionally, that the film 26 at the end of the package remote from the folded edge 24 and to maintain the film in such position, crimp seals 27, 28 are provided to locate the film in the position shown. The flap 25 facilitates opening of the package subsequent to processing of the exposed film therein as will be described hereinafter.

Figure 3:
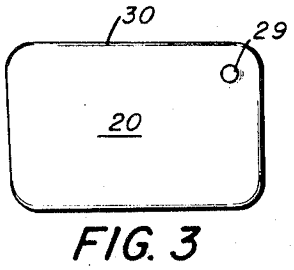
FIG. 3 is a plan view, on a reduced scale, of a second embodiment of packages which can be used with the present invention.
Figure 4:
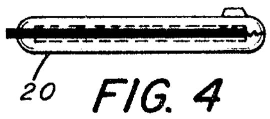
FIG. 4 is a diagrammatic side elevation of the package shown in FIG. 3.

FIGS. 3 and 4 show a further embodiment of the package, wherein on one surface of the package, there is provided a raised blister, 29, which presents a surface such that an injector may be inserted into the package at such position, without scoring the film, for the injection of processing fluid into the package. The blister at least of such a package is preferably of a self-sealing material, such as a highly elastic grade of P.V.C.

Figure 5:
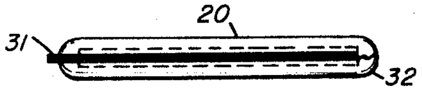
FIG. 5 is a diagrammatic side elevation of the package.

FIG. 5 shows a further simplified embodiment of a package having a peripheral heat seal 31, on three sides thereof, and a folded edge, 32, on the fourth side.

Figure 6:
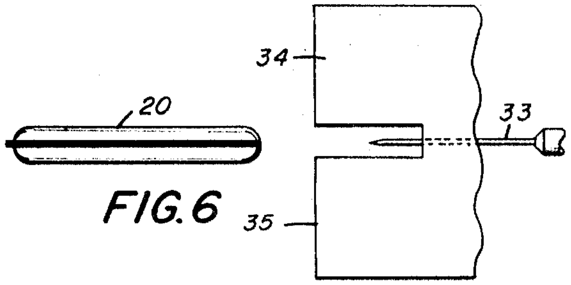
FIGS. 6 and 7 illustrate diagrammatically the manner of insertion in accordance with the present invention of an injector into the package of FIG. 5.
Figure 7:
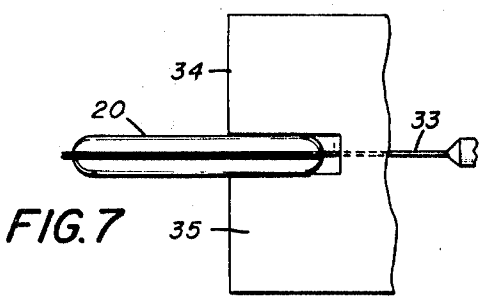
Figure 8:
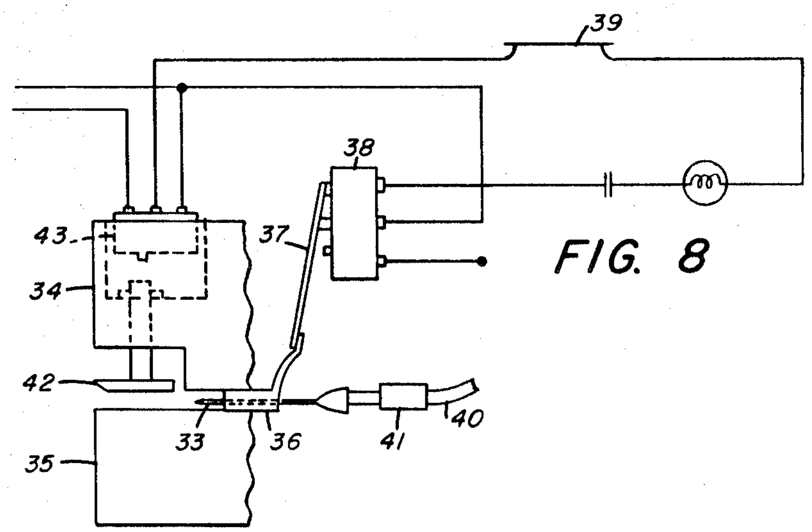
FIG. 8 is a diagrammatic side elevation of the injector device.
Figure 9:
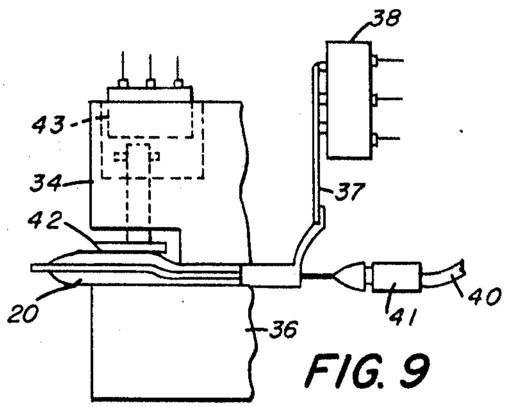
FIG. 9 is a view, similar to FIG. 8, with certain parts having been removed, showing a package having been filled with processing fluid.

FIGS. 6 and 7 show the manner in which processing fluid is injected into the film package. These figures are diagrammatic and are shown with the package being in the form shown in FIG. 5, but it will be appreciated that such diagrammatic apparatus is applicable to the package shown in FIGS. 1 and 2, and with appropriate relocation of the injector 33, with the package shown in FIGS. 3 and 4. The injector 33 is in the form of a hypodermic needle and is located between a pair of jaws 34 and 35. The package is inserted between the jaws so as to impale the package upon the needle which is fixed and the jaws serve to locate the package accurately relative to the needle. FIG. 8 shows, in more detail, although still diagrammatic, the jaws 34 and 35. It will be seen that between the jaws there is located a package sensor, 36, which is connected to a switch arm 37 of a microswitch, 38. Insertion of the package between the jaws 34 and 35 moves the sensor 36 rearwardly so actuating the microswitch 38. The microswitch 38 closes a circuit to a pump 39, which pumps processing fluid through the injector needle 33 and into the package. The conduit 40 from the pump to the injector 33 includes a no-return valve, 41 thus ensuring that no processing fluid leaks from the injector when the package is withdrawn from the jaws. The jaw, 34, includes a resiliently loaded vertically reciprocable platform 42, which is arranged to rest on the package when the package is between the jaws of 34 and 35. As the package swells, due to processing fluid being pumped thereinto, the platform 42 rises and when an appropriate amount of processing fluid has been pumped into the package, the platform 42 operates a microswitch 43 to open the pump circuit. Simultaneously with opening the pump circuit, the microswitch 43 closes a contact to render operative a circuit of an agitator which will be described hereinafter. FIG. 9 shows both microswitches 38 and 43 in their operated condition.

Figures 10, 11, 12:
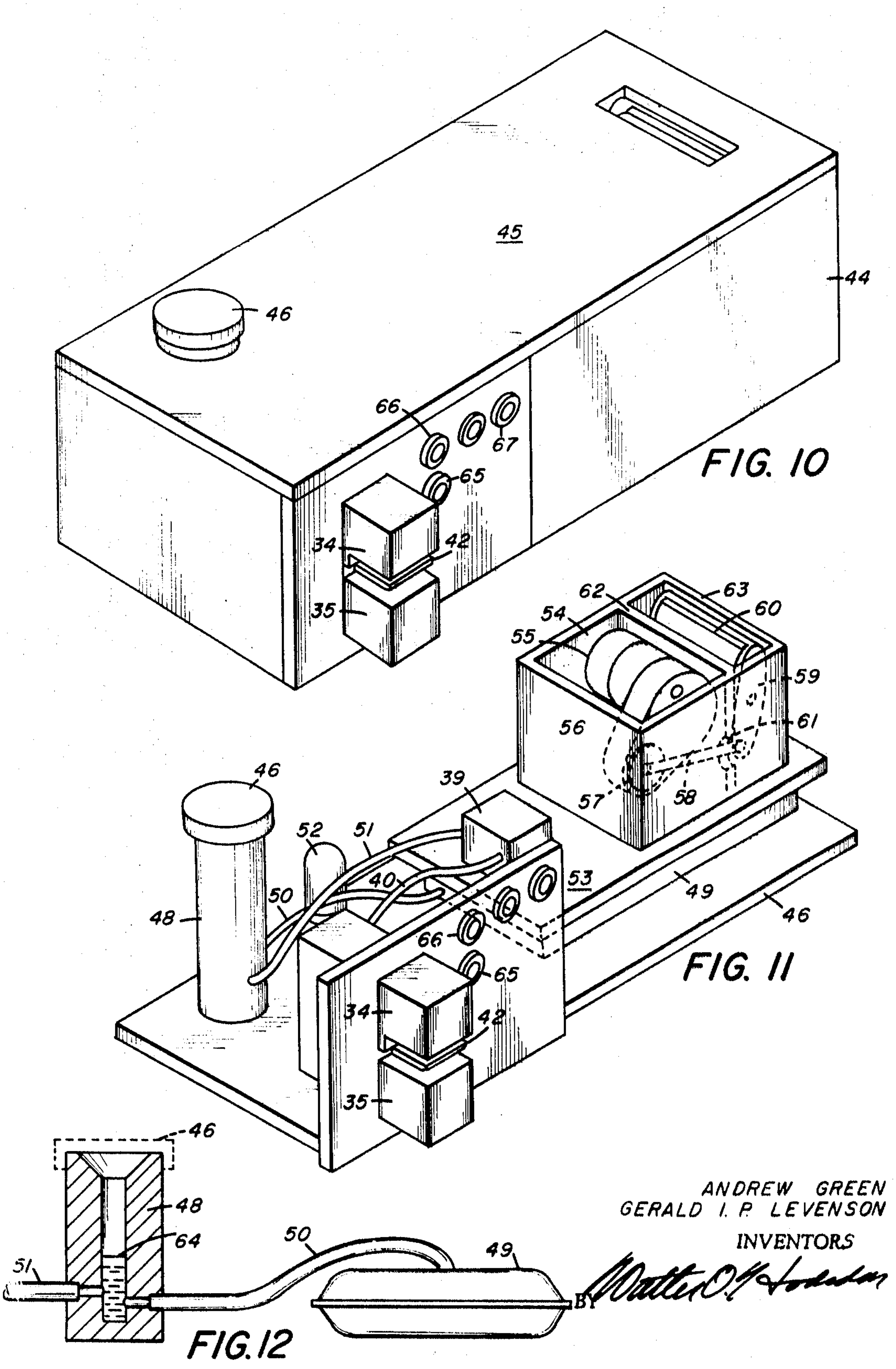
FIG. 10 is a perspective view of a preferred form of apparatus in accordance with the present invention.
FIG. 11 is a view, similar to FIG. 10, showing the apparatus with the cover thereof removed.
FIG. 12 is a diagrammatic side elevation of a processing fluid container showing a filling arrangement and a flexible reservoir therefore.

FIGS. 10 and 11 are general views of the apparatus of the present invention. Referring to these figures, there is shown a housing 44 comprising a removable top cover 45 and base unit 46. The jaws 34, 35 are provided externally of the housing 44. Also provided externally of the housing 44 is a filler having a cap 46 whereby additional processing fluid can be added to the apparatus as and when required. The cover 45 also includes a slot 47 permitting access to an agitator mechanism which will be described hereinafter. As seen in FIG. 11, the filler cap 46 is secured into a funnel 48 which is connected by a duct 50 to a reservoir 49 and by a duct 51 to the pump 39. The reservoir should be of variable volume to adapt itself in volume to the residual volume of fluid. The conduit 40 connects the pump to the injector 33 via the one-way valve 41.

Mounted on the base 46 is a 15 watt pigmy bulb 52 which serves to maintain the temperature internally of the housing 44 at a convenient temperature, for example, 24° C. The bulb may be in a circuit with an appropriate electric thermostat.

A platform 53, besides supporting the pump 39, also supports the agitator unit which is accessible from externally on the housing 44 through the slot 47. The agitator mechanism comprises a casing 54 supporting a constant speed motor 55 therein which motor drives through a reduction gear 56, an eccentric 57 connected via a flexible connecting rod 58 to a frame 59 of the agitator. The frame 59 is rectangular and is pivotally mounted centrally on two opposite sides. The two other opposite sides are defined by paddle members 60, 61, which are mounted at opposite ends of the frames 59. The paddles 60, 61 are covered with a resilient material, for example, a filmed synthetic plastics material and the agitator mechanism operates between walls 62, 63 which are also preferably covered with a filmed plastics material. The agitator conveniently receives packages on each side of the frame 59 and operates in a manner that is more fully shown and described in the aforementioned parent application Ser. No. 705,329. As can be more readily seen in the aforementioned parent application a package inserted between the frame 59 and a wall 62 or 63 of the agitator mechanism is firstly pressed at one end and thereafter at the other end and such pressing is continued for the period of agitation. Such pressure on the package at opposite ends causes the processing fluid to move, fairly rapidly, from end to end of the pack, and, in consequence, ensures an even development.

FIG. 12 shows the manner in which the processing fluid is contained within the apparatus. The flexible reservoir 49 is connected via the duct 50 to the funnel 48 and, through the duct 51 to the pump 39. The funnel 48 includes a float member 64′ therein so as to reduce the surface of processing fluid which is open to the atmosphere and hence capable of degrading. It is preferred, although not shown, that a sensing means such as a microswitch be provided to sense the flexible reservoir 49 to indicate when the fluid content thereof has dropped to a level such that the apparatus should be topped up.

In operation, a dentist, for example, after having taken a radiograph of the patient's jaw, will insert the package, fold forward, into the jaws 34, 35. In so doing, the sensor 36 will be moved rearwardly and at the same time as the injector needle 33 penetrates the wall of the package, the microswitch 38 is actuated to switch on the pump and a panel light, 65, for example green, will also be energized to indicate that the pump is pumping processing fluid through the injector 33 into the package 20. When the package 20 is full, the platform 42 will have been raised to operate the microswitch 43 to deactivate the pump and to set the agitator mechanism in operation. The package is then inserted through the slot 47 into the agitator mechanism so as to lie between the frame 59 and one of the walls 62, 63. A timer mechanism may be incorporated in the apparatus so as to activate the agitator for a set time. After such set time, an audible warning may be given to indicate that the processing of the film within the package is complete.

The panel whereon the jaws 34, 35 are mounted may also include a red warning light 66 which comes into operation when the flexible reservoir contains insufficient solution. A third warning light 67 may be included on the panel so as to indicate when the apparatus has been switched on.

The invention is not confined to the precise details of the foregoing example and many variations are possible within the scope thereof. For example, in order to prevent blockage through evaporation in the injector 33, it is preferred that a keeper be provided for insertion between the jaws 34 and 35 when the apparatus of the invention is not in use.

It is also to be appreciated, of course, that the invention is not confined to its use in processing of dental radiographs as it is perfectly possible to package other films such as normal X-ray film in moisture-impermeable packages of a synthetic plastics material, to seal such packages and to process the same, after exposure, in exactly the same way.

It will be appreciated that the apparatus may be modified so that the single needle may be capable of sequentially injecting firstly one or more developing fluids, evacuating the fluids from the package after development of the light-sensitive element, injecting a fixing fluid and subsequently, if required evacuating the fixing fluid. Alternatively, several injectors may be provided each arranged to inject and/or evacuate a particular fluid from the package.

The invention has been described in detail with particular reference to a preferred embodiment thereof, but it will be understood that variations and modifications can be effected within the spirit and scope of the invention as described hereinabove and as defined in the appended claims.

We claim:

1. An apparatus for injecting fluid into a hermetically sealed distensible package comprising:

means for gripping such package to hold it in a predetermined position;

means activated in response to the presence of said package in said position for injecting fluid into the package to at least partially fill the same;

means for sensing the distension of the package to detect the volume of fluid injected therein; and means responsive to said sensing means for terminating the injection of fluid into the package when a predetermined distension of the package is sensed indicating that a desired volume of fluid has been injected therein.

2. The invention according to claim 1 wherein said gripping means comprises a pair of jaws for engaging opposite sides of said package to locate the package in said position and in operative relation to said injecting means.

3. The invention according to claim 1 wherein said injecting means comprises:

means operatively associated with said gripping means for detecting the presence of a package in said position;

means including a hollow tubular member for piercing the package and for conducting fluid into the package; and control means responsive to a signal from said detecting means for initiating the flow of fluid through said hollow tubular member into said package.

4. The invention according to claim 1 wherein said sensing means comprises:

means disposed for engagement with said package to move with the distension thereof, said engaging means operatively interconnected with said terminating means to terminate the flow of fluid into the package upon movement of said engagement means to a predetermined location by distension of the package.